United States Patent [19]

Newkirk

[11] Patent Number: 4,923,499
[45] Date of Patent: May 8, 1990

[54] ARTICLE TRANSFER MECHANISM
[75] Inventor: Mark C. Newkirk, Vineland, N.J.
[73] Assignee: Maul Technology Corporation, Winchester, Ind.
[21] Appl. No.: 348,154
[22] Filed: May 2, 1989

Related U.S. Application Data

[63] Continuation of Ser. No. 206,907, Jun. 10, 1988, abandoned, which is a continuation of Ser. No. 216,334, Dec. 16, 1980, abandoned.

[51] Int. Cl.$^5$ .............................................. C03B 9/40
[52] U.S. Cl. ........................................ 65/163; 65/160; 65/164; 198/448; 198/740; 901/20; 901/22; 901/24; 901/25
[58] Field of Search ......................... 65/160, 163, 164; 901/20, 22, 24, 25; 198/448, 479, 739, 740

[56] References Cited

U.S. PATENT DOCUMENTS

| | | | |
|---|---|---|---|
| 2,113,929 | 9/1934 | Benoit | 198/31 |
| 3,559,537 | 2/1971 | Faure | 91/462 |
| 3,779,362 | 12/1973 | Horn | 198/24 |
| 3,795,503 | 3/1974 | Perry | 198/490 |
| 4,007,028 | 2/1977 | Bublitz et al. | 65/163 |
| 4,084,083 | 4/1978 | McNally | 364/118 |
| 4,203,752 | 5/1980 | Becker et al. | 198/740 |
| 4,313,750 | 2/1982 | Lulejian et al. | 65/160 |

Primary Examiner—Arthur Kellogg
Attorney, Agent, or Firm—Woodard, Emhardt, Naughton, Moriarty & McNett

[57] ABSTRACT

Plural article transfer mechanisms are operated in timed sequence by an electronic control synchronized to a main drive shaft. Each article transfer mechanism transfers articles from a dead plate to a moving conveyor. An extensible-retractable pusher arm engages, moves and releases the articles between 90° positions under control of a fluid motor mounted on a turntable. Operation of the fluid motor is based on rotary alignment of a pair of turntable ports with a pair of fluid supply channels in a turntable drive body. The turntable is stepped in rotary increments between 90° positions by an electric stepping motor. The angular speed profile of the pusher arm between the 90° positions is governed by a programmed electronic control, including a PROM, which drives the stepping motor. An adjustable finger clip assembly is snap-fitted on the pusher arm and provided with a handle for ease of replacement.

17 Claims, 12 Drawing Sheets

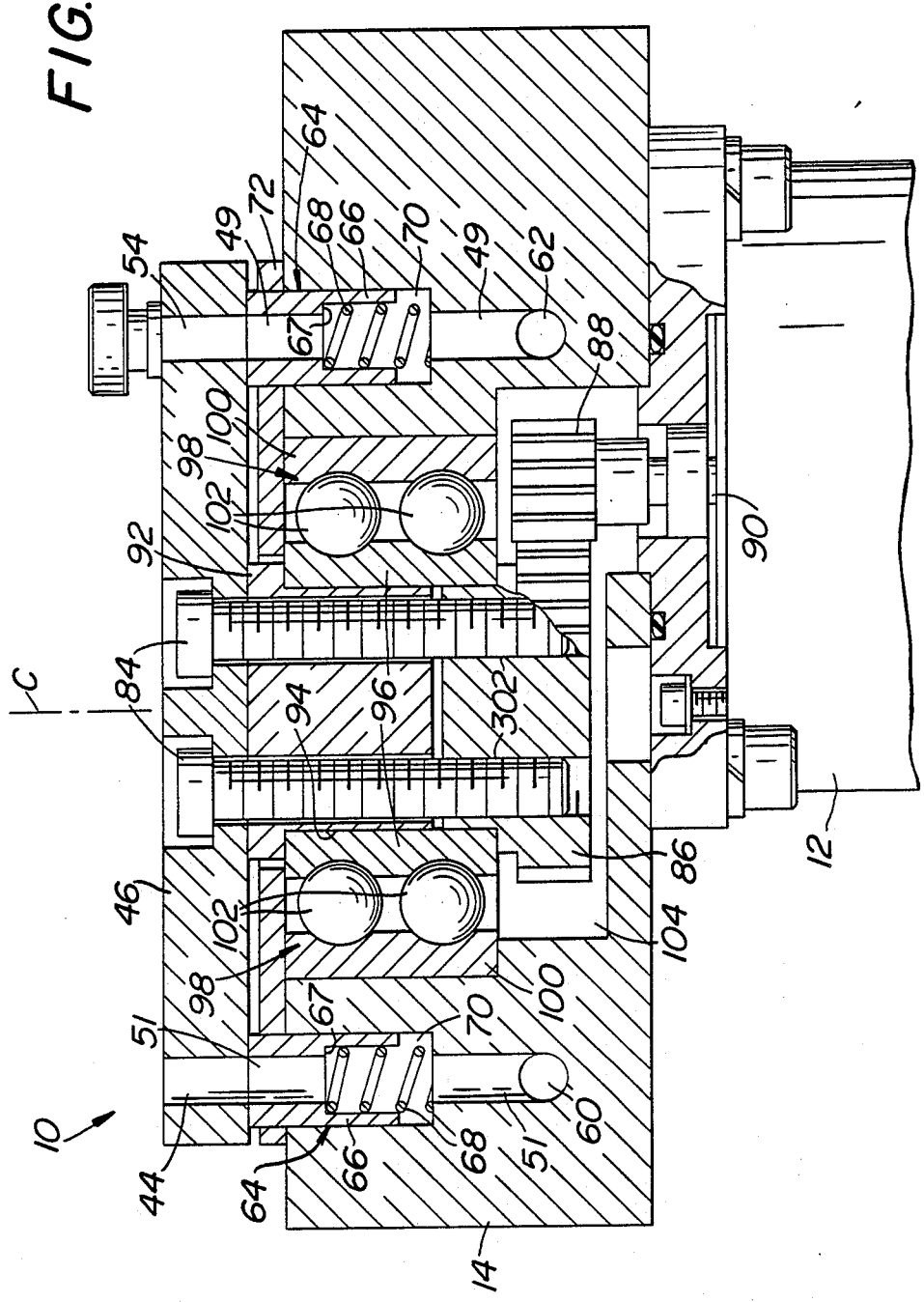

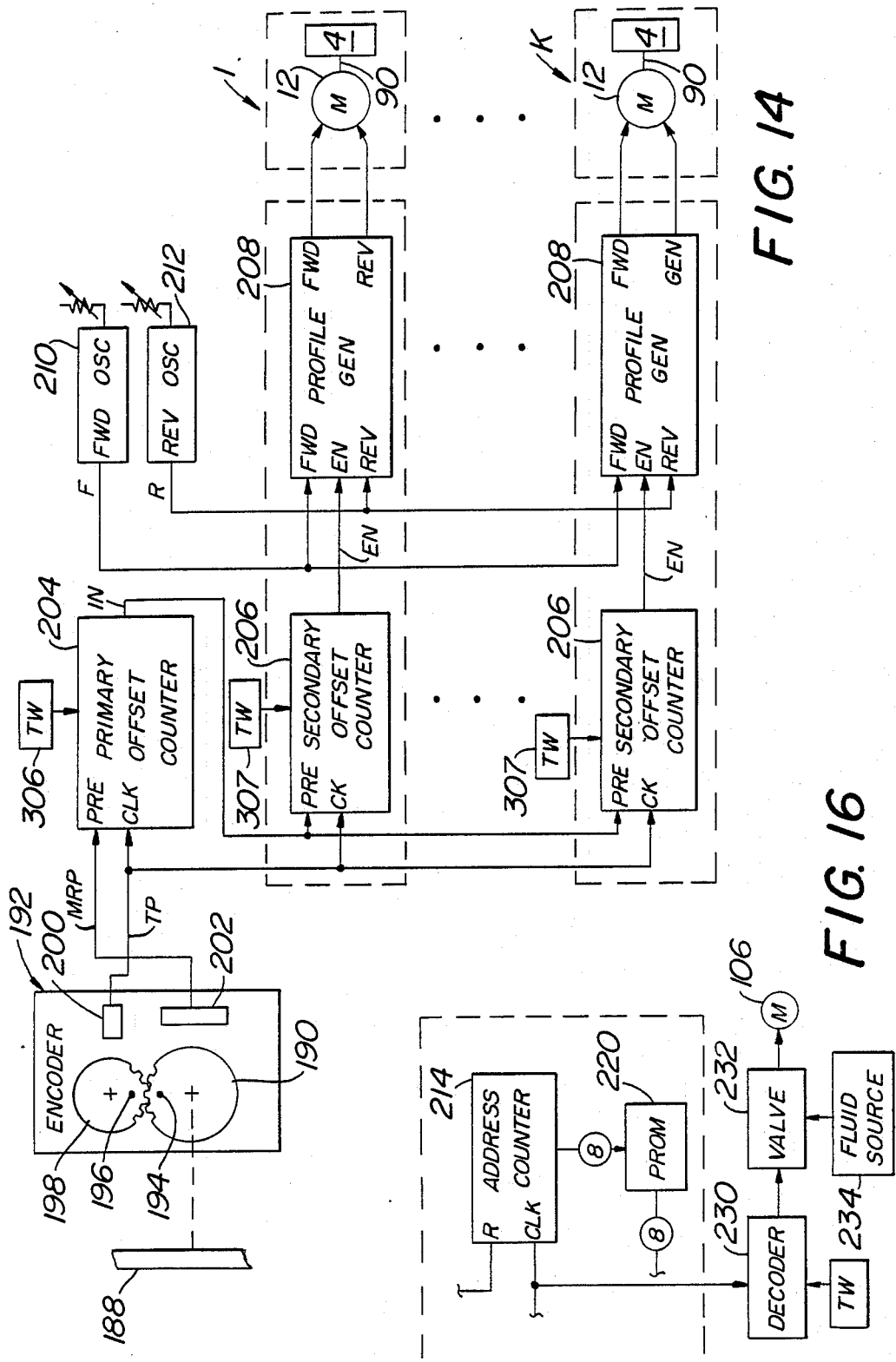

ARTICLE TRANSFER MECHANISM

This application is a continuation of application Ser. No. 07/206,907, filed June 10, 1988 which is a continuation of Ser. No. 06/216,334 filed Dec. 16, 1980, both now abandoned.

BACKGROUND OF THE INVENTION

The present invention is directed to an article transfer mechanism known as a 90° pusher which is adapted for use in a wide variety of I.S. machines (so-called Individual Section machines). In particular, the invention is directed to a 90° pusher wherein the angular speed profile is governed by a programmed electronic element such as a PROM and wherein plural pusher stations are operable in a predetermined timed sequence by an electronic control synchronized to the main drive shaft of the I.S. machine.

So-called 90° pushers are known in the art. For example, see U.S. Pat. No. 3,779,362 issued Dec. 18, 1973 and Pat. No. 4,203,752 issued May 20, 1980. The 90° pusher transfers articles such as newly formed glass containers from a dead plate to a moving conveyor. Plural pusher stations are normally employed, the stations being operated in a predetermined timed sequence. As disclosed in Pat. Nos. 2,113,929 issued Apr. 12, 1938 and 4,203,752 an electric motor may be associated with each pusher station. The sequence of operation of the pusher stations may be governed by a drum and cam machanism, as disclosed in Pat. No. 3,779,362, or by a timing disk and electric switch network as disclosed in Pat. No. 4,203,752

In Pat. No. 4,203,752, the speed profile of the pusher arm is determined by the electric motor and a crank and rocker mechanism. A mechanism of this type has interrelated mechanical parts which are subject to malfunction and wear. Moreover, adjustment of the speed profile of the pusher arm can only be changed by changed the crank and rocker mechanism itself.

BRIEF SUMMARY OF THE INVENTION

Plural pusher stations are electronically controlled in a predetermined timed sequence in phase synchronism with a main drive shaft. Each pusher station is associated with an electric stepping motor which reciprocates a pusher arm between 90° positions, i.e., between a dead plate and the center line of a moving conveyor. The angular speed profile of the pusher arm is determined by a PROM or other programmable electronic element in the pusher station electronic circuit, facilitating alteration of the speed profile by reprogramming or replacement of the element. The pusher arm is extensible and retractable, to engage and release articles at the 90° positions, under control of a fluid motor mounted on a turntable which is rotated by the stepping motor. The pusher arm speed profile can be smoothed by changing the gear ratio between the stepping motor and fluid motor and by manipulating a set of thumb-wheel switches and a selectable divider in the pusher station electronic circuit. A finger clip assembly is snap-fitted on the pusher arm and is provided with a handle, facilitating adjustment and replacement.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 5 is a section of the turntable drive (equipped for both left hand and right hand machine operation) taken along the lines 5—5 in FIG. 3, the turntable being rotated 90° from the position shown in FIG. 3.

FIG. 14 is a block diagram of the pusher station electronic circuit.

FIG. 16 is a block diagram of a modified pusher station electronic circuit for controlling the fluid motor in an alternative embodiment of the invention.

DETAILED DESCRIPTION OF THE INVENTION

Figure 1:
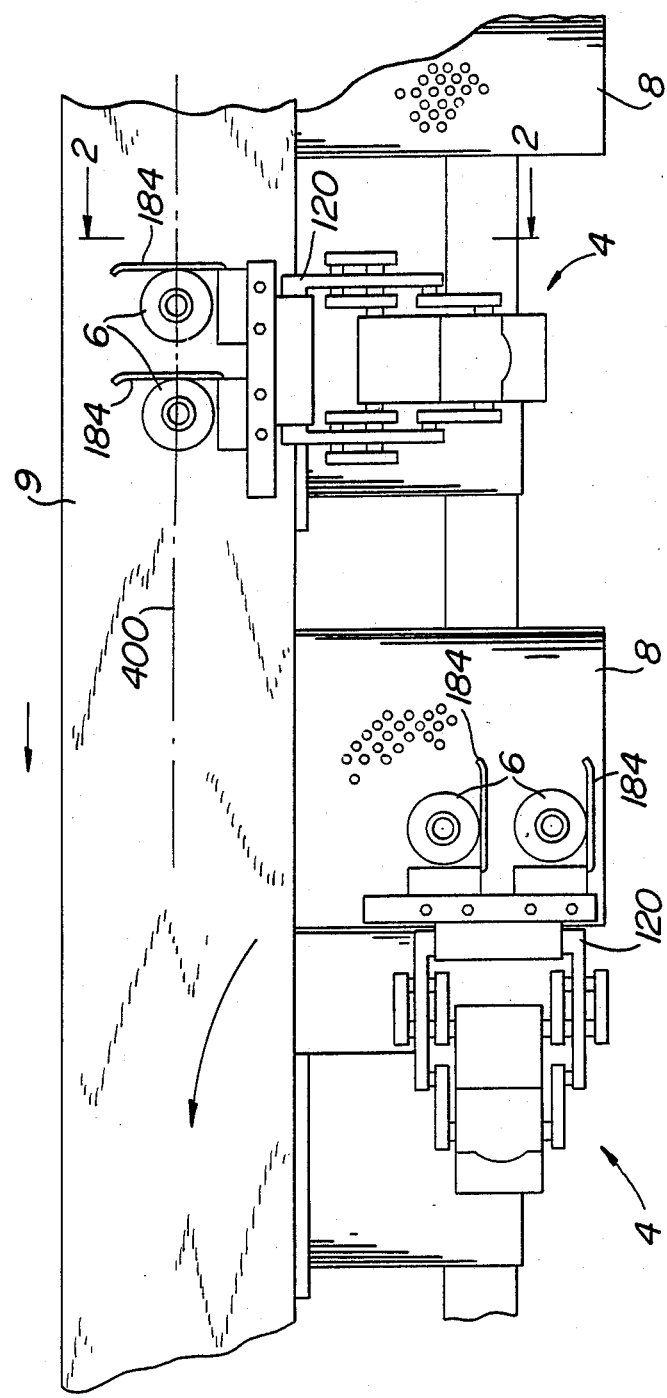
FIG. 1 is a plan view of two article transfer mechanisms of the 90° pusher type according to the invention showing travel of the pusher station arms between 90° positions.

Referring to the drawings in detail, wherein like numerals indicate like elements, there is shown in FIG. 1 a plan view of two operating article transfer mechanisms or 90° pushers which are identical, each being designated generally as 4. Each mechanism 4 is shown as a righthand mechanism which transfers articles 6, such as newly formed glass bottles, deposited on a dead plate 8 to a moving conveyor 9 which moves from right to left in FIG. 1. It should be understood that the mechanism 4 could also be a lefthand mechanism located on the opposite (right) side of the dead plate to transfer articles from the dead plate to a moving conveyor which moves from left to right in FIG. 1. The invention herein covers both righthand and lefthand mechanisms, operation of both types of mechanism being identical other than for direction of movement as is evident from the following description of the invention.

In the embodiment shown in FIG. 1, each mechanism 4 transfers the articles 6 two at a time from the associated dead plate 8 to the moving conveyor 9. Thus, for simplicity it is assumed that the I.S. machine produces two articles per machine cycle. Of course, other numbers of articles could be produced every machine cycle and transferred together from the dead plate to the conveyor within the spirit and scope of the invention. For example, one, three or four articles could as well be produced by the I.S. machine and transferred one, three or four at a time from the dead plate to the conveyor. The article transfer mechanisms 4 are mounted on conveyor 9, as described hereafter, the mechanisms 4 being operated in a prescribed sequence to transfer articles 6 deposited on each dead plate 8 to the conveyor 9 in an orderly procession. Formation of an orderly procession of articles on a conveyor in this manner is known for example from U.S. Pat. No. 3,779,362 issued Dec. 18, 1973 incorporated herein by reference. Article transfer mechanisms of the 90° pusher type are disclosed in U.S. Pat. No. 4,203,752 issued May 20, 1980 and U.S. Pat. No. 3,779,362 issued Dec. 18, 1973, incorporated herein by reference.

TURNTABLE DRIVE

Each mechanism 4 includes a turntable drive designated generally as 10. See FIG. 2. The turntable drive includes a turntable 46. A fluid motor 106 is bolted to the turntable. The fluid motor retracts and extends a pusher arm 120 as described hereafter. The pusher arm 120 is reciprocated in an arc in a horizontal plane between 90° positions adjacent the dead plate 8 and conveyor 9. The turntable drive includes an electric stepping motor 12 which steps the turntable 46 in rotary increments. The stepping motor 12 is bolted to a drive body 14. The body 14 rests on a shoulder 16 of a support 18. The support 18 is bolted to a beam 20 (which is part of the conveyor 9 structure) through a spacer 22. A belt guide 24 is bolted to the spacer 22 and the support 18 at the top edge of the beam.

Figure 6:
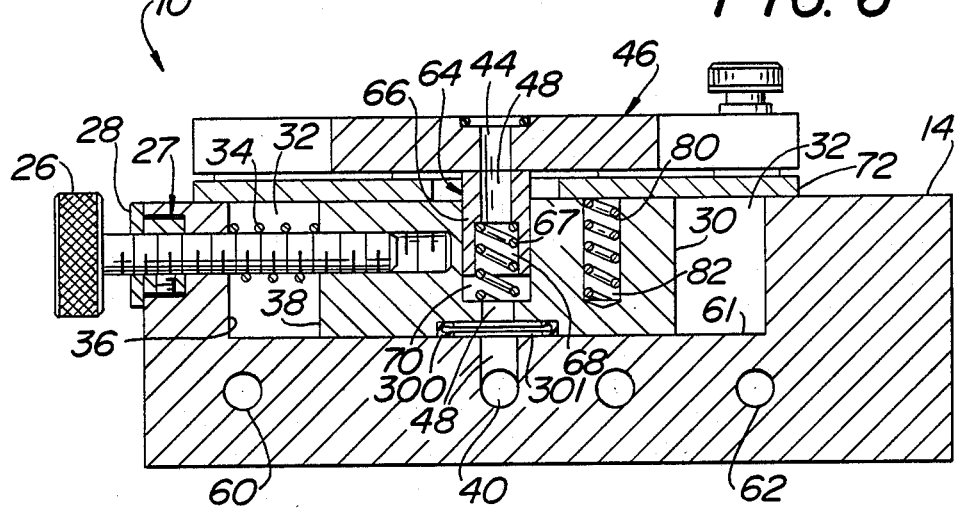
FIG. 6 is a section of the turntable drive taken along the lines 6—6 in FIG. 3.

A thumbscrew 26 is adjustably positioned in a bore in body 14 and is retained in position by a collar and set screw 27 seated in an opening in body 14. See FIGS. 2 and 6. A fastening plate 28 is screw fastened to the body 14 to retain the collar and set screw in body 14. The thumbscrew 26 extends within a threaded bore in a sliding block 30. The thumbscrew positions the sliding block within an elongate cavity 32 in body 14 so as to align a fluid supply channel 48 in block 30 with a "retract" port 44 in turntable 46 as described more fully hereafter (FIG. 6). The overall shape of the cavity 32 is shown in phantom in FIG. 3. A spring 34 surrounds a portion of the thumbscrew shaft between the inner wall 36 of cavity 32 and an outer wall 38 of the sliding block 30 (FIG. 6).

A fitting 42 is seated (threaded) in a vertical fluid supply channel 59 in body 14. See FIG. 4. Fluid such as air is injected through the fitting 42 via a fluid source, conduit and valve control (not shown). The fluid flows through channel 59 to a horizontal channel 40 in body 14 (FIGS. 3A and 6) and through channel 48 to the "retract" port 44 in turntable 46 when the port 44 is rotated into alignment with channel 48. The fluid then enters the fluid motor 106 (FIG. 2) which retracts the pusher arm.

Figure 3A:
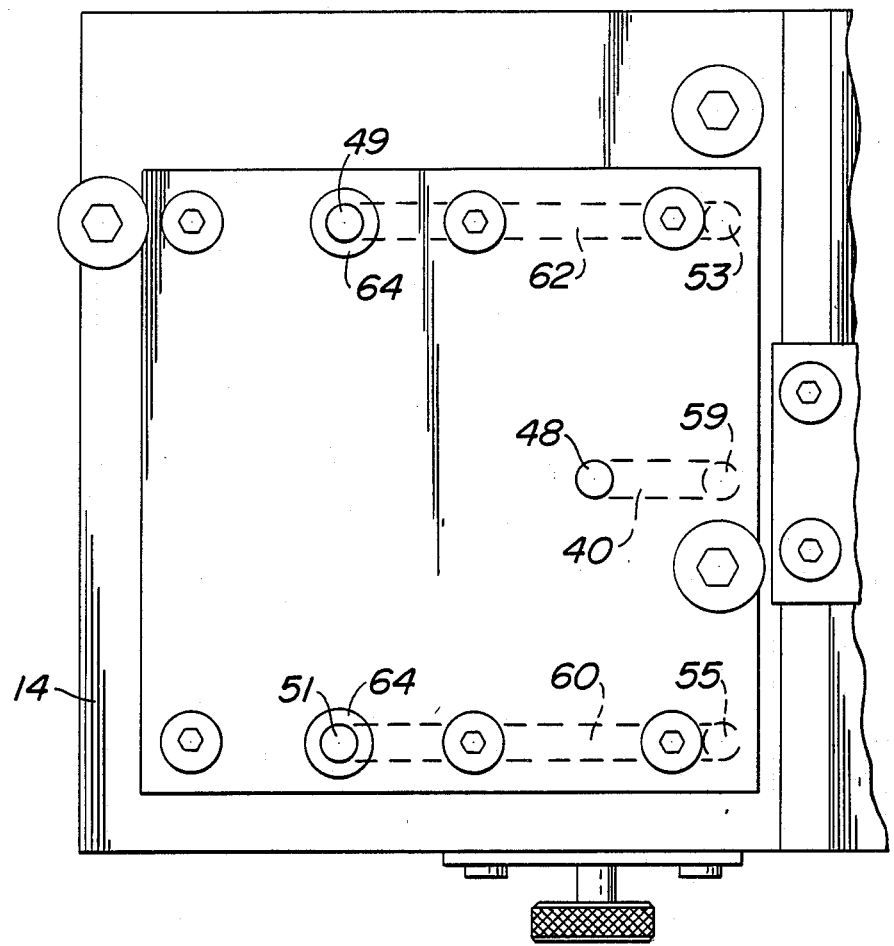
FIG. 3A is a diagrammatic plan view of the fluid channels in the turntable drive body.
Figure 4:
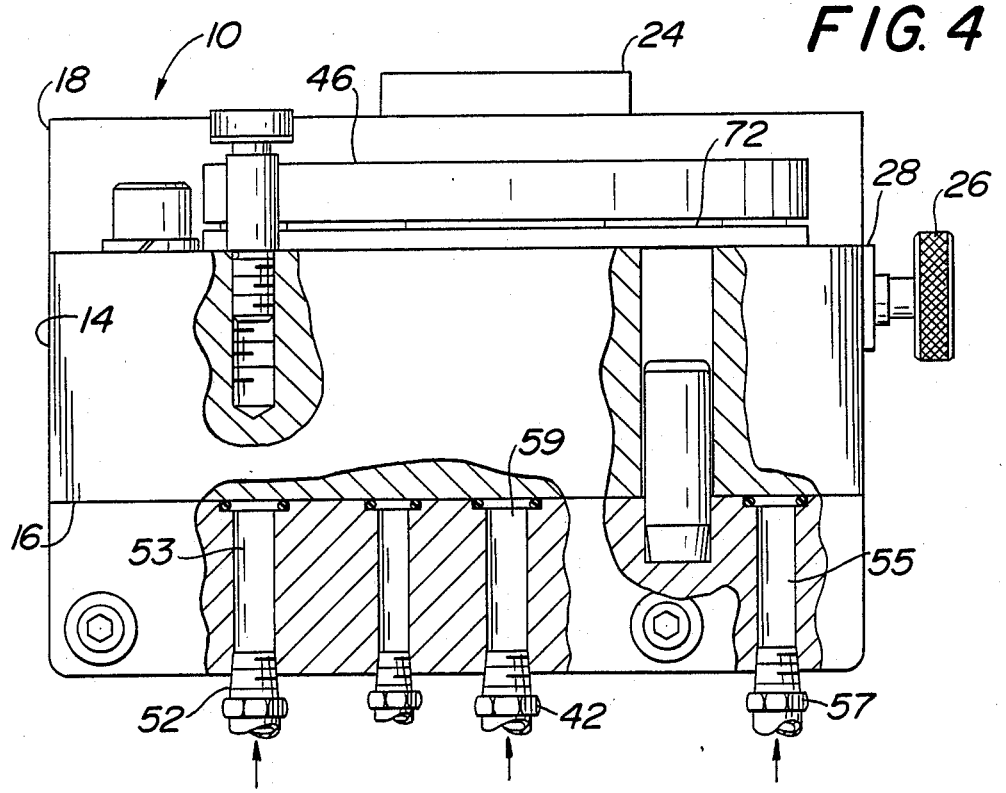
FIG. 4 is a front view of the turntable drive showing the fluid channel fittings.

A pair of vertical fluid supply channels 49, 51 are formed in body 14 (FIG. 5) at diametrically opposite positions equally spaced from the central axis C of the turntable. These channels are used to extend the pusher arm 120 as described hereafter. The channels communicate with horizontal channels 60, 62 in body 14 which lead to vertical fluid supply channels 55, 53 respectively (FIGS. 3A, 4 and 6). As shown in FIG. 4, a fitting 52 is seated (threaded) in channel 53, and a fitting 57 is seated in channel 55. Only one of fittings 52, 57 is connected to the fluid source (not shown). If the mechanism 4 is a "righthand" mechanism, fitting 52 is connected to the source and fitting 57 is left open. If the mechanism 4 is a "lefthand" mechanism, fitting 57 is connected to the source and fitting 92 is left open.

Assuming a "righthand" mechanism, fluid is injected through fitting 52 and vertical channel 53 to horizontal channel 62 and vertical channel 49 and on to an "extend" port 54 in turntable 46 (identical to "retract" port 44) when the "extend" port is rotated into alignment with the vertical channel 49. See FIG. 5. Assuming a "lefthand" mechanism, fluid is injected through fitting 57 and vertical channel 55 to horizontal channel 60 and vertical channel 51 and on to the "extend" port 54 when the "extend" port is rotated into alignment with vertical channel 51.

Each of the vertical channels 48, 49, 51 (FIGS. 5 and 6) are defined in part by spring-loaded seals 64 having identical constructions. Each spring-loaded seal 64 comprises a piston 66 having an internal annular shoulder 67, one end of a spring 68 pressing against the shoulder. The other end of the spring presses against the bottom of a cavity 70 which communicates with channel 48 (FIG. 6) or channel 51 or 49 (FIG. 5). Each piston 66 is urged by associated spring 68 into sliding contact with the underside of turntable 46 so that fluid such as air passing through channels 48, 49 or 51 is trapped if the channel is not aligned with a turntable port. Any pressurized air in channels 44 and 54 (FIG. 5) will vent to atmosphere when the channels and turntable ports are not aligned as described more fully hereinafter.

Figure 3:
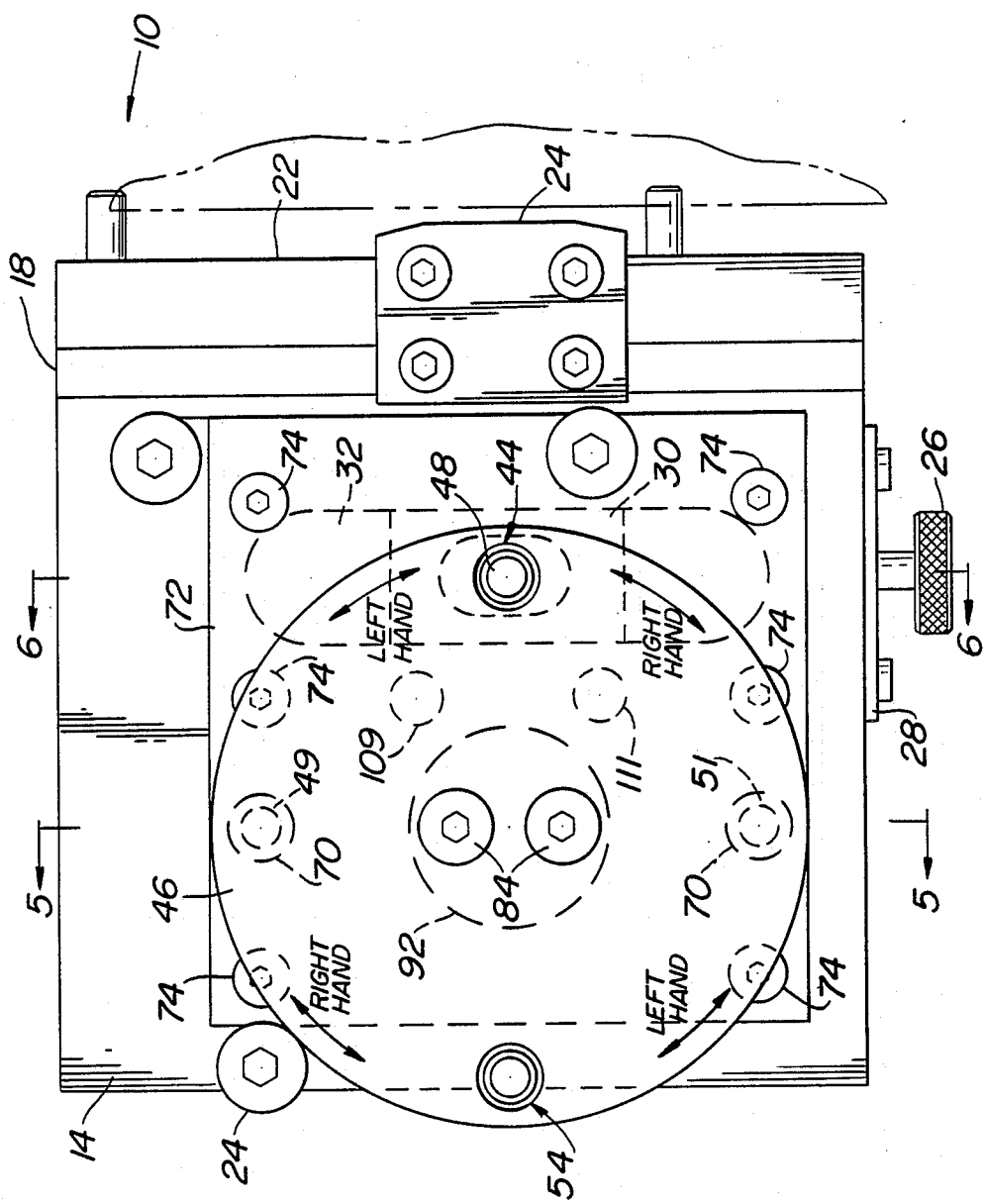
FIG. 3 is a plan view of the turntable drive taken along lines 3—3 in FIG. 2.

The turntable drive 10 includes a top plate 72 fastened by screws 74 to the drive body 14 (FIGS. 3 and 6). A spring 80 seated in a bore 82 in block 30 presses against the underside of plate 72 (FIG. 6). The spring exerts a downward force, pressing block 30 against the bottom surface 61 of cavity 32 when screws 74 are in place so that fluid passing through channel 48 does not escape between block 30 and body 14 into cavity 32. A sliding ring shaped seal 300 is located in a recess 301 in the underside of block 30 to further prevent leakage of the fluid from channel 48 to cavity 32.

The turntable 46 is fastened to a gear 86 by means of a pair of screws 84 (FIGS. 3 and 5). The gear 86 is driven by a pinion 88 mounted on the stepping motor shaft 90. The turntable is easily separated from the unit by removal of screws 84. The turntable rests on a cylindrical support 92 provided with clearance holes through which the screws 84 pass. The screws 84 are threaded in bores 302 in the gear 86. During assembly, as the screws are threaded in bores 302, the gear 86 moves upwards towards turntable support 92 so that the support 92 and gear 86 are aligned within cavity 104 in body 14 so as to clamp inner race 96 in the annular recess 94. The inner race 96 therefore moves with the support 92 and gear 86. The inner race 96 is part of a double ball bearing assembly 98 comprising a stationary outer race 100 and ball bearings 102.

As the stepping motor 12 is actuated, the motor shaft 90 advances in rotary or angular increments, causing step-wise rotation of the turntable 46. As described more fully hereafter, the "retract" and "extend" ports 44, 54 in the turntable are swept in steps over a 90° arc between the position wherein the "retract" port 44 is aligned with the vertical channel 48 in sliding block 30

(FIGS. 3A and 6) and the position wherein the "extend" port 54 is either aligned with vertical channel 49 ("righthand" mechanism) or vertical channel 51 ("lefthand" mechanism) in body 14 (FIGS. 3A and 5). Depending upon the angular position of the turntable ports 44, 54 with respect to the drive body channels 48, 49, 51, fluid will either enter "retract" port 44, pass through the fluid motor 106 and vent through "extend" port 54 to atmosphere (ports 44 and 54 in the positions shown in FIG. 3) or enter "extend" port 54, pass through the fluid motor 106 and vent through "retract" port 44 to atmosphere (ports 44 and 54 rotated 90° to the left or right from the positions shown in FIG. 3). Fluid flow through ports 44 and 54 based on rotation of turntable 46 is more particularly described in connection with the operation of the fluid motor 106.

FLUID MOTOR

Figure 7:
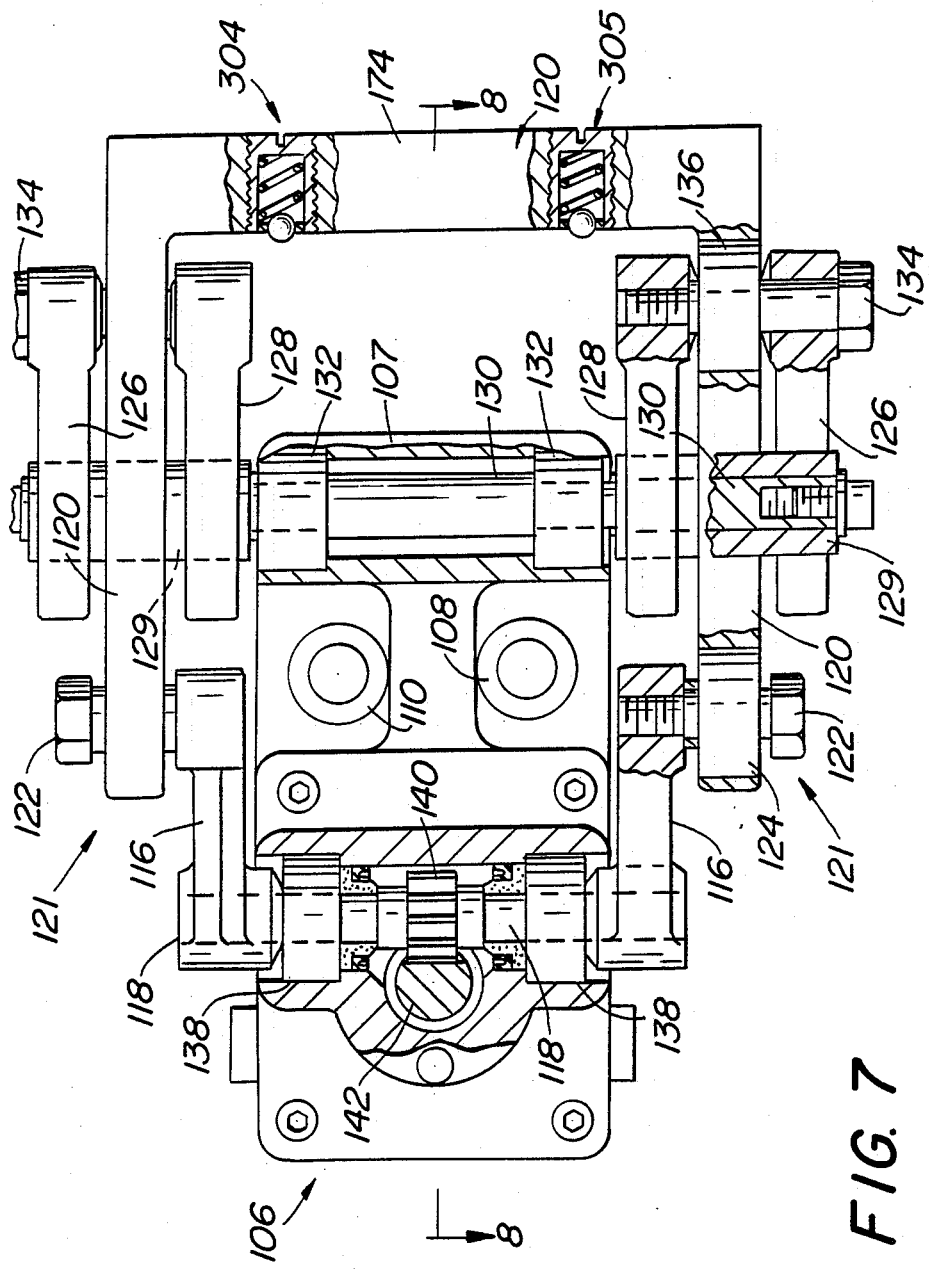
FIG. 7 is a plan view in partial section of the fluid motor drive taken along the lines 7—7 in FIG. 2.

The fluid motor 106 retracts and extends the pusher arm 120 as shown in FIGS. 2 and 7-10. Referring to FIG. 7 in detail, the fluid motor 106 is fastened to turntable 46 by means of bolts (not shown) which extend through counterbores 108, 110 in the fluid motor body or casing 107 and holes 109, 111 in turntable 46 (FIG. 3). The pusher arm 120 is pivotably coupled to identical linkage assemblies 121 mounted on a shaft 118. Each assembly 121 includes a drive link 116 locked on shaft 118. A shoulder bolt 122 which is journaled in a bearing 124 (only one of which is shown) mounted in the pusher arm is secured to drive link 116. Thus, the pusher arm 120 is pivotably mounted on the shoulder bolt 122. Each assembly 121 includes a single piece casting which comprises a pair of slave links 126, 128 connected by a sleeve 129 mounted on a shaft 130. The shaft 130 is journaled in bearings 132 in the motor body 107. A bolt 134 journaled in a bearing 136 (only one of which is shown) in the pusher arm is secured to both links 126, 128. Thus, the pusher arm 120 is pivotably mounted on the bolt 134.

Figure 8:
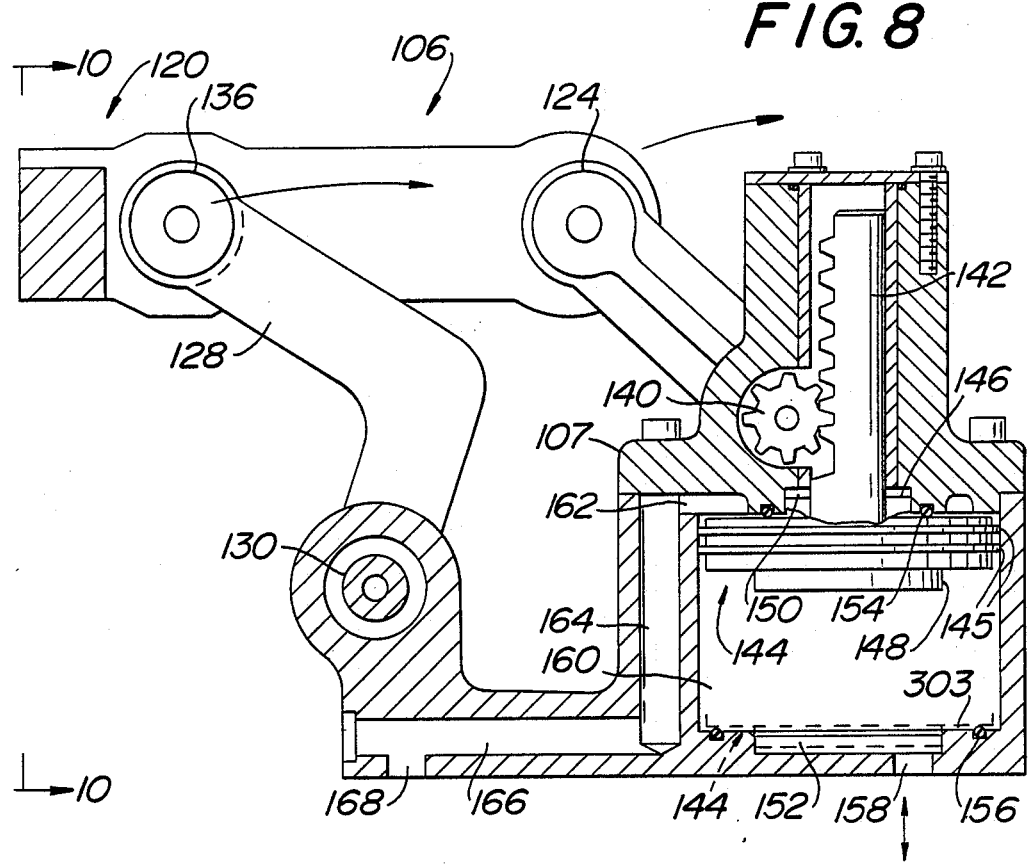
FIG. 8 is a section of the fluid motor drive taken along the lines 8—8 in FIG. 7 showing the pusher arm in the extended position.

The shaft 118 is journaled in bearings 138 mounted in the motor body 107. A pinion gear 140 is mounted on the shaft 118 (FIGS. 7 and 8). Referring to FIG. 8, the pinion gear is driven by a rack 142. A piston 144 is secured to the lower end of the rack 142. A pair of sealing rings 145 are mounted on the piston 144. Opposite faces of the piston are provided with cylindrical pilots 146 and 148. The pilot 146 enters a mating recess 150 on the upstroke of the piston and the pilot 148 enters a mating recess 152 on the piston downstroke. As pilot 146 enters mating recess 150 on the upstroke of the piston, fluid (air) is trapped in recess 150. The trapped fluid is forced to bleed through the annular gap or clearance between pilot 146 and the interior wall of recess 150. The higher than atmospheric pressure generated in recess 150 serves to decelerate the piston near the end of its upstroke, providing a cushioned effect to the mechanism motion. An annular seal 154 is seated in a groove in the interior of the motor body to absorb any residual motion of the piston, preventing metal to metal contact between the piston top surface and the interior of the motor body at the end of the upstroke.

As pilot 148 enters mating recess 152 on the downstroke of the piston, fluid (air) is trapped in the annular area 303 between the outside of pilot 148 and the interior wall of recess 160. The trapped fluid is forced to bleed through the annular gap or clearance between pilot 148 and the interior wall of recess 152. The back pressure results in piston deceleration at the end of the piston downstroke. An annular seal 156 is seated in a groove in the interior of the motor body to absorb any residual motion of the piston, preventing metal to metal contact between the piston lower surface and the interior of the motor body at the end of the downstroke.

Referring to FIG. 8, a port 158 in the motor body communicates with the recess 152. When the fluid motor 106 is bolted to the turntable 46, the port 158 is aligned with the turntable "extend" port 54 and the port 168 is aligned with "retract" port 44 (FIG. 3). In FIG. 8, the pusher arm 120 is shown in the extended position, the rack 142 being shown at the extreme of the upward stroke. To move the piston upwardly to extend the pusher arm, fluid must enter the port 158 and flow through recess 152 into chamber or cylinder 160. For fluid to flow into port 158, either the turntable "extend" port 54 must be aligned with channel 49 and the turntable "retract" port 44 must be aligned with channel 51 (righthand mechanism) or the "extend" port must be aligned with channel 51 and the "retract" port must be aligned with channel 49 (left hand mechanism). See FIGS. 3, 3A and 5. In either case, during the upward stroke of the piston 144, fluid escapes from the topside of the piston through communicating channels 162, 164 and 166 in the motor body, venting through port 168 and turntable "retract" port 44 (FIGS. 3, 5 and 8). Thus, channel 49 is used as an inlet to ports 54 (turntable) and 158 (fluid motor) if the article transfer mechanism is a "righthand" unit, channel 51 then being used as an exhaust only channel with fluid escaping through channels 51, 60 and 55 to atmosphere, and channel 51 is used as an inlet to ports 54 and 158 if the article transfer mechanism is a "lefthand" unit, channel 49 then being used as an exhaust only channel with fluid escaping through channels 49, 62 and 53 to atmosphere. In either case, when "extend" port 54 aligns with channel 49 ("righthand" mechanism) or 51 ("lefthand" mechanism), the piston 144 is driven upwardly and the pusher arm 120 is extended as the rack 142 drives pinion gear 140. In the extended position of pusher arm 120, the articles 6 on dead plate 8 are engaged and then transferred from the dead plate 8 to conveyor 9. See FIG. 1.

Figure 2:
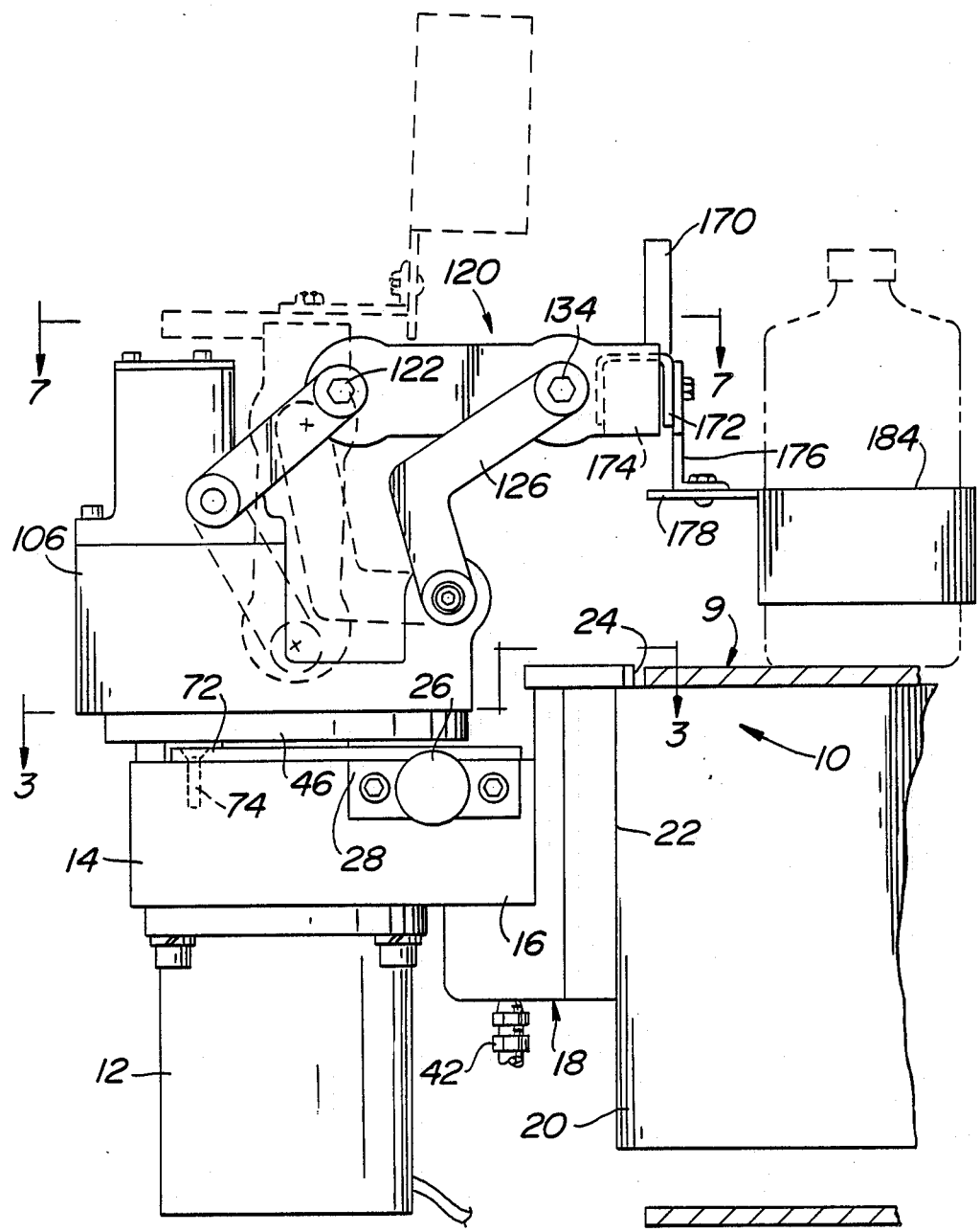
FIG. 2 is a side elevation of the article transfer mechanism showing the pusher arm in extended and retracted positions.
Figure 9:
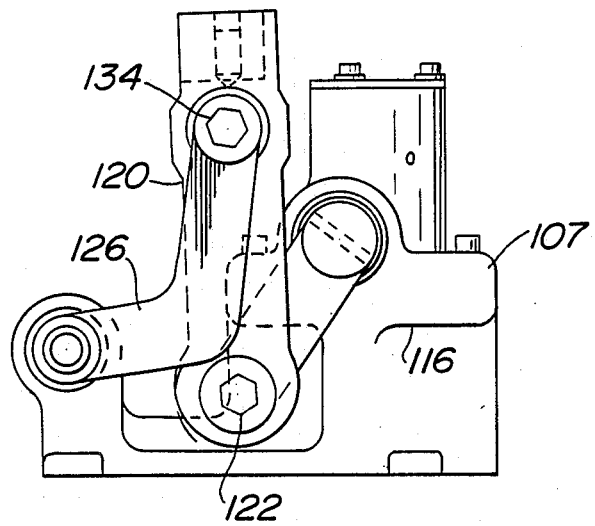
FIG. 9 is a side elevation of the fluid motor drive showing the pusher arm in the retracted position.
Figure 10:
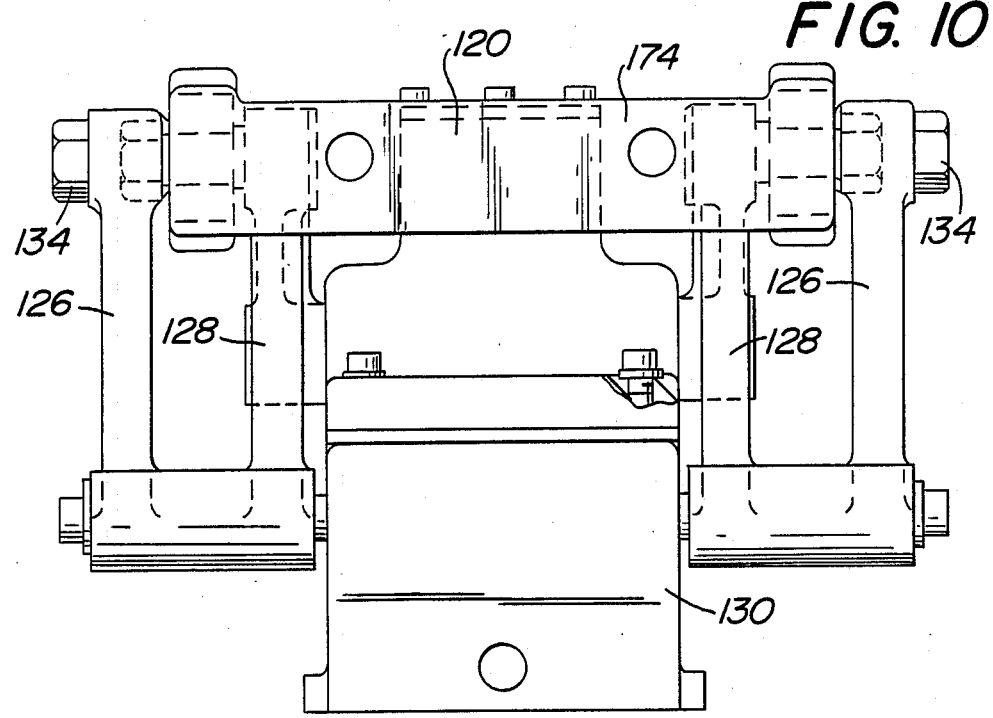
FIG. 10 is a front elevation of the fluid motor drive taken along lines 10—10 in FIG. 8.

As turntable 46 is stepped by electric motor 12 with the pusher arm extended by fluid motor 106, the pusher arm is swung away from the dead plate 8 and moved towards conveyor 9. The "extend" port 54 moves out of alignment with channel 49 (or 51) (FIG. 3) and fluid vents from chamber 160 (FIG. 8) through port 158 and port 54 to atmosphere when port 54 clears the channel. The rack 142 and pinion 140 remain enmeshed while the pusher arm remains extended. The "retract" port 44 moves out of alignment with channel 51 (or 49) and into alignment with channel 48 after 90° rotation of the turntable. Fluid then flows through fitting 42 and channel 48 to "retract" port 44 (FIGS. 3, 3A and 6) and into fluid motor port 168 and channels 166, 164 and 162 to drive the rack 142 downwardly in chamber 160 (FIG. 8). Piston 144 then forces fluid through port 158, and this fluid vents through "extend" port 54 to atmosphere. As the piston 144 descends, rack 142 drives pinion gear 140, causing the pusher arm 120 to retract and pivot from the extended horizontal position to almost vertical position (FIGS. 2, 8 and 9). The pusher arm is therefore retracted after 90° rotation of the turntable at which time the articles 6 have been deposited on conveyor 9. The pusher arm releases the articles by swinging upwardly while retreating horizontally from the articles (FIG. 2).

When the pusher arm 120 is retracted, the electric motor 12 reverses the direction of movement of the turntable 46 so that the pusher arm swings back while retracted over 90° towards the dead plate. The "extend" port 54 returns in steps towards the initial position in alignment with vertical channel 49 (or 51). When "extend" port 54 moves back into alignment with channel 49 (or 51), the pusher arm 120 is again extended in the manner previously described to engage the articles newly deposited on dead plate 8 before transferring the articles to the moving conveyor 9. In particular, the pusher arm is extended horizontally while descending towards the articles on the dead plate. The pusher arm is repeatedly swung back and fourth betwen 90° positions in this fashion, extension and retraction of the pusher arm 120 taking place at the 90° positions wherein the "extend" port 54 and the "retract" port are aligned with channels 48, 49 and 51 as previously described.

FINGER CLIP ASSEMBLY

Figure 11:
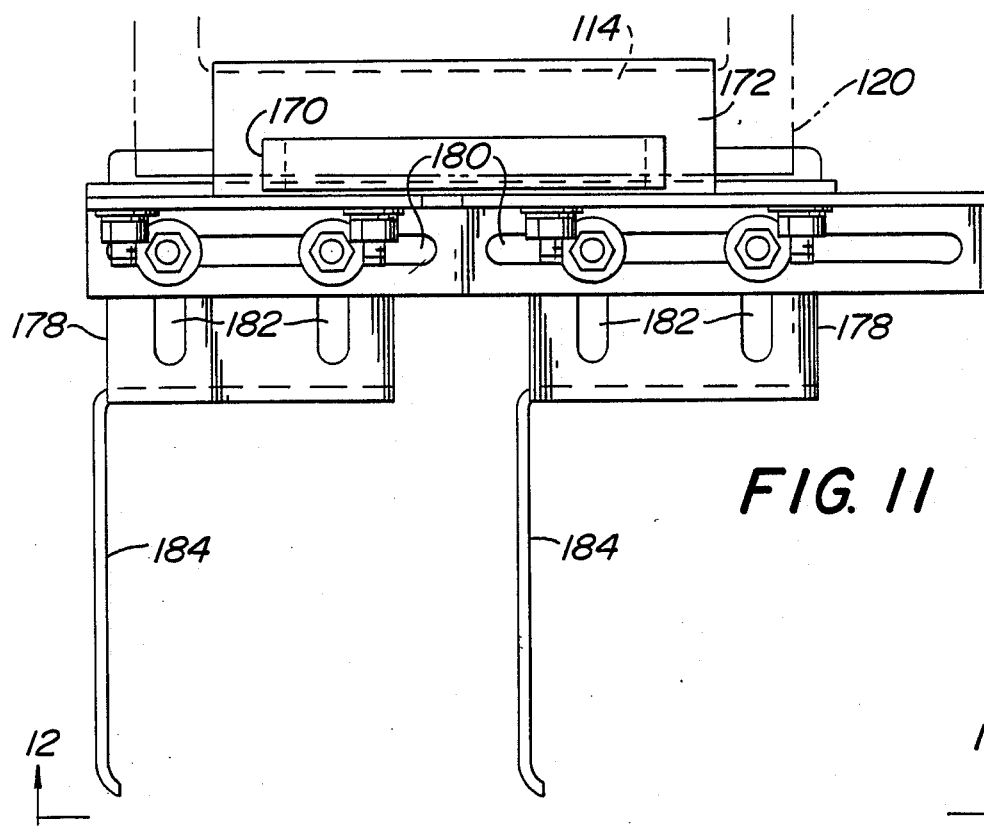
FIG. 11 is a plan view of the finger clip assembly for a right-hand machine.
Figure 13:
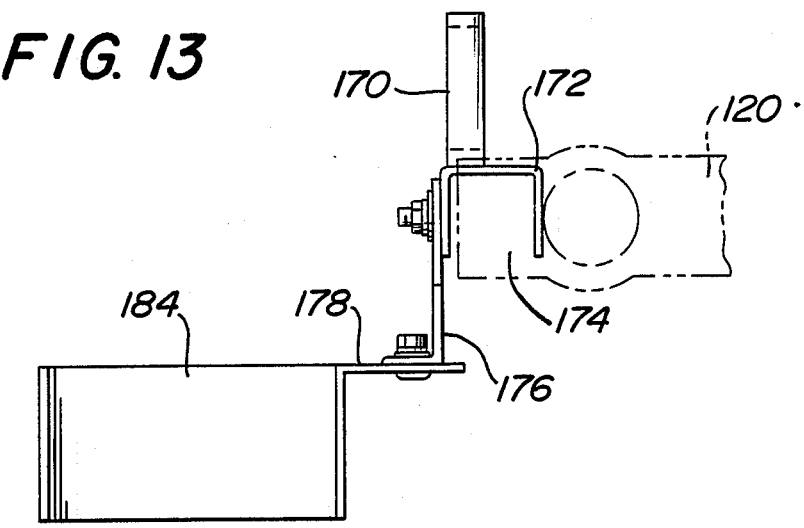
FIG. 13 is a side elevation of the finger clip assembly taken along lines 13—13 in FIG. 12.
Figure 12:
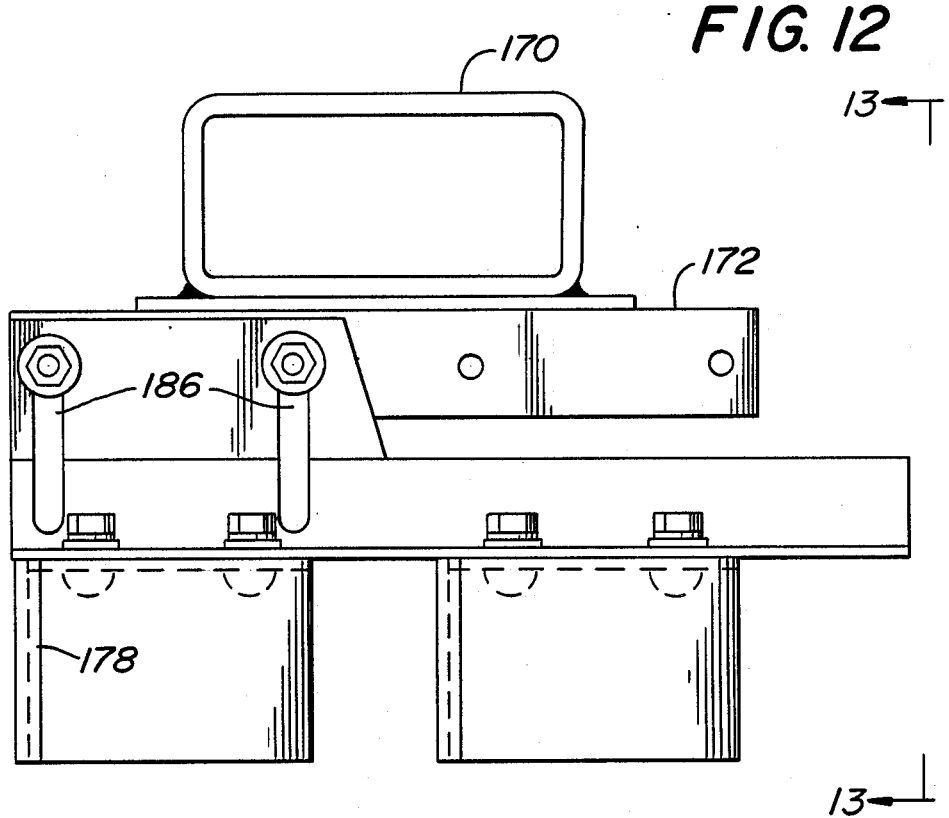
FIG. 12 is a front elevation of the finger clip assembly.

A finger clip assembly for a "righthand" machine is shown in FIGS. 11-13. The assembly includes a handle 170 secured to an arm clip 172 (FIG. 13). The arm clip 172 is snap-fitted on the pusher arm bar 174 and held in place by frictional engagement with spring loaded ball plungers 304, 305 (FIG. 7) which align with a pair of location holes (not shown) in the rear portion of clip 172. The clip 172 is bolted to an angle bracket 176. A pusher plate 178 is bolted to the bracket 176. The angle bracket 176 and pusher plate 178 are provided with transverse overlapping slots 180, 182 (FIG. 11) to permit lateral adjustment of the pusher plate fingers 184 in orthogonal directions. The angle bracket 176 is provided with a pair of slots 186 (FIG. 12) to permit adjustment of the elevation of the pusher plate fingers 184. The pusher plate fingers 184 engage the articles 6 as indicated in FIG. 1.

Replacement of a finger clip assembly is facilitated by the handle 170, avoiding the danger of an operator accidentally brushing his hand against an article 6 such as a bottle which may be extremely hot. The operator merely grips the handle which is safely spaced from the article and pulls the arm clip 172 off bar 174 in order to remove the assembly. A new clip assembly is then mounted on the bar 174, the angle bracket 176 having previously been bolted to the arm clip 172 at the desired elevation, and the pusher plate 178 having been bolted to the angle bracket 176 at the desired positions of the fingers 184.

The finger clip assembly for a "lefthand" machine would be substantially identical to that shown in FIGS. 11-13, differing only in the pusher plate 178 whose fingers 184 would then be located in alignment with the right top edge of plate 178, the slight curve at the end of each finger then facing towards the left.

ELECTRONIC CONTROL

Figure 15:
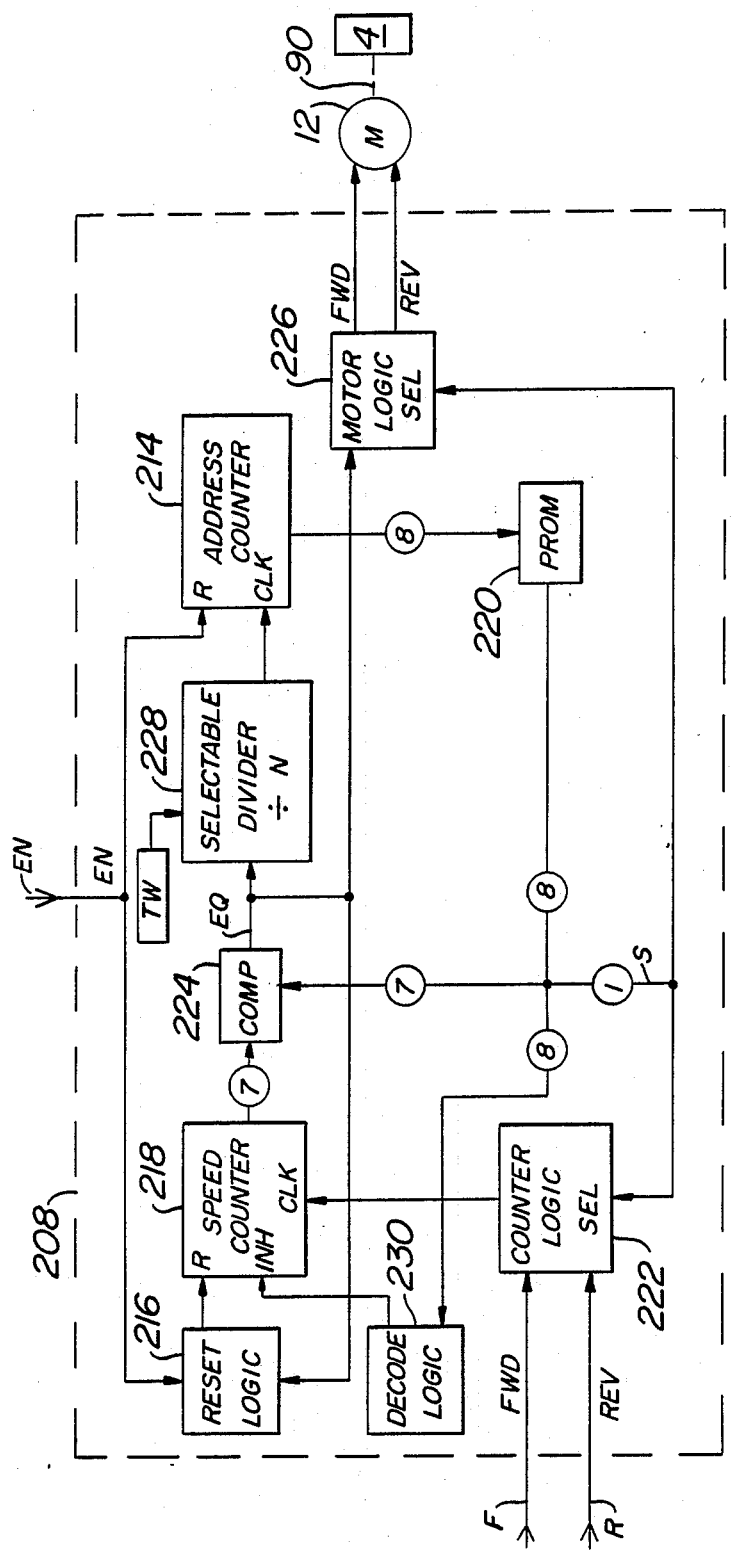
FIG. 15 is a block diagram of the profile generator of each pusher station electronic circuit.

The electronic control for all article transfer mechanisms 4 (FIG. 1) is shown in FIGS. 14-16. The article transfer mechanisms 4 form only a part of an otherwise conventional article processing machine such as an I.S. machine having other well known mechanisms for forming and operating on the articles, all components of the machine including conveyor 9 being driven in synchronism by a main drive shaft 188 (FIG. 14). In the present invention, the shaft 188 is coupled to a 90 tooth gear 190 in an encoder 192. The encoder 192 is part of the electronic control of the present invention. The gear 190 is provided with a magnetic segment 194 which is aligned with a like magnetic segment 196 in a 72 tooth gear 198 which is driven by gear 190. A proximity sensor 200 of the variable reluctance type senses each tooth of the gear 198 as the gear rotates and emits a tooth pulse (TP pulse) for each sensed tooth. In the preferred embodiment of the invention described herein, there will be 72 TP pulses for one complete revolution of gear 198.

A pair of series connected reed switches 202 are arranged to sense alignment of the magnetic segments 194, 196 and emit a master reset pulse (MRP pulse) when the segments move into alignment. The magnetic segments 194, 196 move into alignment every four revolutions of the gear 190. Preferably, gear 190 is coupled by right angle gearing (not shown) to the drive shaft 188 such that the gear 190 completes four revolutions either every four revolutions of the drive shaft 188 or every five revolutions of the drive shaft. Gear 198 completes five revolutions every four revolutions of gear 190. Depending on the type of I.S. machine used, either four or five revolutions of the drive shaft 188 represents one complete cycle of the I.S. machine. The magnetic segments 194, 196 move into alignment, resulting in the generation of a MRP pulse, at the beginning of each machine cycle so that the electronic control for the article transfer mechanism of the present invention is "in phase" with or synchronized precisely to the article processing or I.S. machine throughout the machine cycle.

Referring to FIG. 14, the MRP pulse presets a primary offset counter 204 which then counts the TP pulses emitted by sensor 200. The sensor 200 emits a stream of 360 TP pulses for each machine cycle (five revolutions of the gear 198). Each TP pulse therefore represents 1° of rotation of main shaft 188. The primary offset counter 204 is a down counter which counts down to zero from a preset count fixed by operator manipulable thumbwheel switches 306 and then emits an initialize pulse (IN pulse). The IN pulse resets a bank of secondary offset counters 206 each of which are associated with a separate pusher station designated 1 through k where k is the total number of pusher stations. An article transfer mechanism 4 is located at each pusher station. The sequence of operation of the pusher stations is determined by the secondary offset counters 206.

Each of the secondary offset counters 206 is a down counter which counts down to zero from a preset count (which may vary from station to station) fixed by operator manipulable thumbwheel switches 307 and then emits an enable pulse (EN pulse). The EN pulse enables an associated profile generator 208. The profile generator controls the forward and reverse windings of the associated stepper motor 12. Once enabled, the profile generator 208 controls motor 12, first in response to a pulse train F generated by a free-running forward oscillator 210 and then in response to a pulse train R generated by a free-running reverse oscillator 212 as described more fully below. The pulse repetition frequencies of the forward oscillator pulse train F and reverse oscillator pulse train R may be the same or different depending on the desired speed profile for each of the stations 1-k. The pulse repetition frequency of each pulse train may be separately varied by means of separate manually operable potentiometers associated with each oscillator 210, 212.

The electronic details of the profile generator 208 are shown in FIG. 15. Each profile generator 208 is activated or enabled by the EN pulse emitted by the associated secondary offset counter 206. The EN pulses are emitted by the offset counters 206 in a prescribed sequence determined by presetting successive offset counters 206 so that the counters count down from increasingly higher preset counts or limits before emitting an EN pulse. As a result, the pusher stations l-k are operated under control of the profile generators 208 in a predetermined timed sequence, each pusher station being operated when the associated counter 206 reaches zero.

When a profile generator 208 receives an EN pulse, the EN pulse resets an address counter 214 and conditions a reset logic circuit 216 to reset a speed counter 218. Preferably, the speed counter 218 either counts the forward pulses F or the reverse pulses R depending on the state ("0" or "1") of a sign bit S at the output of a PROM 220. More particularly, the sign bit S controls the select input (SEL) of a counter logic circuit 222 which passes either forward pulses F or reverse pulses R to the clock input (CLK) of the speed counter 218. The sign bit changes state at the 90° positions of the pusher arm.

Preferably, the address counter 214 is a 12 bit counter. Eight of the counter 214 outputs bits are used to address the PROM 220. A data word (seven bits plus the sign bit S) is stored at each address of the PROM. Each data word is representative of the desired lapse in time between consecutive steps of the stepping motor 12. That is, the data word represents the spacing in time between consecutive steps of the motor 12.

The speed counter 218 counts up the forward pulses F or the reverse pulses R, depending on the state of the sign bit S, and a comparator 224 compares the count of the speed counter 218 to the data word appearing at the output of PROM 220. When the comparator detects a match between the count of the speed counter and the PROM output, the EQ output of the comparator changes state. This change in state is transmitted to a motor logic circuit 226 which activates the forward or reverse winding of the motor 12 depending on the state of the sign bit S at its select input (SEL). If the forward winding is energized, the motor shaft 90 advances one step in the forward direction with the pusher arm being extended. Thus, in the forward direction, articles 6 are transferred from the dead plate to conveyor 9. If the reverse winding is energized, the motor shaft advances one step in the reverse direction with the pusher arm being retracted. Thus, in the reverse direction, the pusher arm returns from the conveyor to its initial position over the dead plate in preparation for the next transfer.

Preferably, the motor 12 is a digital slipping motor is capable of full step or half step operation. The motor shaft 90 rotates 1.8° for each step in the full step mode; and the shaft rotates 0.9° for each step in the half step mode. The motor shaft rotates in the selected increments for each change in state of the EQ output of comparator 224 caused by a match of the speed counter and PROM outputs.

PROM

When a match is detected, the EQ output changes state (as previously described) and resets the speed counter 218 via reset logic circuit 216. In addition, the change in state of the EQ output is detected by a selectable divider 228, described in greater detail below, which for present purposes may be assumed to advance the address counter 214 one count for each change in state of the EQ output due to a match. When the address counter 214 advances its count to a new PROM address, the PROM 220 outputs a new data word, and the EQ output of the comparator returns to the initial state to indicate that no match is presently detected between the PROM output and the speed counter output. Thus, a pulse is formed at the EQ output corresponding to each match of the speed counter and PROM outputs. As the speed counter counts up in response to the forward pulses F (or reverse pulses R), the motor 12 shaft remains stationary. When the count of the speed counter reaches the value of the new data word at the output of PROM 220, the EQ output of comparator 224 changes state to indicate the match condition, and the motor logic circuit 226 again advances the motor shaft 90 by a rotary increment or step.

As can be seen from the foregoing, consecutive steps of the motor 12 are spaced in time by the amount of time required for the speed counter 218 to reach the value of each new data word generated by the PROM 220. Thus, the values of the data words generated by PROM 220 determine the angular speed profile (speed vs. time curve) of the motor 12 and transfer mechanism 4. If the values of consecutive data words are relatively small, the motor 12 will be stepped relatively rapidly whereas if the values of the data words are relatively large, the motor will be stepped relatively slowly. Increases and decreases in speed of the motor may be effected by selecting appropriate values for each data word read out of the PROM 220. Accordingly, the PROM 220 may be programmed to obtain any desired speed profile of the transfer mechanism, and the speed profile may be changed simply and rapidly by reprogramming the PROM or by replacing it with a differently programmed PROM.

Preferably, the PROM 220 is provided with a number of addresses or memory locations sufficient to store four unique speed profiles. The PROM 220 may be a type 2708 PROM organized in a 1024×8 bit format with 256 memory locations being available for each profile, although less than all 256 memory locations is actually required for any one profile. As previously indicated, 8 output bits from counter 214 are used to address the PROM 220 for each stored speed profile. Two additional address bits from board mounted DIP switches (not shown) may be employed to select any one of the four speed profiles.

SELECTABLE DIVIDER

The selectable divider 228 is provided to compensate for variations in the gear ratio between the gear 88 on motor shaft 90 and the turntable gear 86 (FIG. 5). Thus, at the beginning of the speed profile, as the pusher arm 120 begins to traverse an arc towards the conveyor, the gear ratio of gears 86 and 88 may result in a "chopped" rotary motion of the turntable. The gear ratio between gears 86 and 88 may be altered to reduce the size of each rotary increment of the turntable corresponding to each fixed rotary increment of the motor shaft thereby smoothing the turntable motion. Since the number of rotary increments experienced by the turntable is the same as the number of increments of the motor shaft, which remains unchanged, this has the effect of reducing the total rotary displacement of the turntable and likewise the total arc traversed by the pusher arm.

The selectable divider 228 is adjusted to compensate for the change in gear ratio and to restore the total rotary displacement of the turntable and pusher arm to 90°.

The selectable divider 228 divides the EQ output of the comparator 224 by a preselected factor N. In the example of operation provided above, it was presumed that N=1 for a 1:1 gear ratio of gear 86 to 88, and that the numbers of steps of the motor 12 required for 90° rotation of the turntable was the same as the number of addresses of PROM 220.

If for example the gear ratio of gear 86 to 88 is now altered to 2:1 i.e. by a factor of 2 while the PROM remains unchanged, the total rotary displacement of the turntable would be reduced from 90° to 45°. The selectable divider is used to rostore the rotary displacement of the turntable to 90°. In particular, the divider is adjusted by means of thumbwheel switches TW or the like so that N=2 (the new gear ratio). The EQ output of comparator 224 must now change state in the same direction twice before the address counter 214 is advanced to the next count or address. The first change in state of the EQ output of the comparator will not produce a new address at the output of counter 214. The data word output of PROM 220 therefore remains unchanged. As a result, the speed counter 218 must count to the value of the same data word output of PROM 220 a second time before the counter 214 advances to a new PROM address. Thus, two consecutive steps of the motor 12 now occur, each after the time interval corresponding to the PROM output at the unchanged address before the counter advances to the new PROM address.

In effect, then, the setting N of the selectable divider determines the number of motor steps at each PROM address. Accordingly, in the given example where N=2, the number of steps of the motor shaft is doubled to restore the total rotary displacement of the turntable to 90°.

FORWARD AND REVERSE PULSE TRAINS

The first 90° rotation of the turntable (transfer of articles from the dead plate to the conveyor) is controlled by the forward pulses F and the reverse 90° rotation (return of the pusher arm from the conveyor to the dead plate) is controlled by the reverse pulses R. The PROM is programmed so that when the motor shaft 12 rotates an amount such that the turntable is displaced approximately 90° in the forward direction, the sign bit S generated by PROM 220 changes state. As a result, the reverse pulses R are now transmitted by counter logic circuit 220 to the speed counter 218. The motor 12, therefore, steps in the reverse direction with a speed profile determined by the pulses R and the succeeding data words read out of PROM 220.

As previously indicated, the speed profiles in the forward and reverse directions may be different, as each profile is determined by a different group of words stored in PROM 220. Also, as previously indicated, a speed profile may be altered either by altering the contents of the PROM 220 itself or by changing the ratio of gears 86 and 88 and the setting of selectable divider 228. Additionally, by altering the pulse repetition frequencies of the forward and reverse pulses F and R, a speed profile may be "expanded" or "compressed" since the pulse repetition frequencies of pulses F and R determine the rate of advance of the counter 218.

DECODER 230

In the foregoing description of the preferred embodiment, the fluid motor 106 is mounted on the turntable 46, and extension and retraction of the pusher arm 120 is determined by the angular position of the turntable ports 44, 54 with respect to the channels 48, 49 and 51. Retraction at the moment that the articles 6 are deposited on the conveyor center line 400 (FIG. 1) is ensured by adjusting the thumbscrew 26 (FIG. 6) so that port 44 aligns with channel 48 at that time. If desired, retraction of the pusher arm can be controlled electronically rather than by adjustment of thumbscrew 26. The sliding block 30 need not be movable for this modification of the invention. For example, when port 44 first moves into overlapping relation with channel 48, the articles 6 may be slightly skewed with respect to the conveyor center line. Retraction should not be initiated until the port 44 and channel 48 are aligned such that the articles 6 are "on line" with the conveyor center line. Until the pusher arm reaches the position at which retraction should occur to avoid skewing, the valve 232 (FIG. 16) is maintained closed by a decoder circuit 230. As a result, no fluid is supplied to the motor 106, precluding retraction of the pusher arm. The output of the decoder circuit 230 operates the fluid valve 232. The decoder 230 is a down counter which is preset at the start of operation by operator manipulable thumbwheel switches. The decoder counts down from the preset count in response to the divider 228 output which indicates each change of the PROM addresses. Every address of the PROM therefore represents N uniform increments in rotary displacement of the turntable. The preset count represents the number of addresses required for the turntable port 44 to align with channel 48 such that the articles 6 are "on line" with the conveyor center line. When decoder 230 counts down to zero, the decoder opens valve 232 to permit fluid flow from source 234 to the fluid motor 106. Accordingly, the pusher arm is retracted when the articles 6 are "on line". During the time taken to fully retract the pusher arm to the (phantom) vertical position shown in FIG. 2, the turntable continues to rotate under the drive of stepper motor 12. When the sign bit output of PROM 220 changes state, the direction of rotation of the turntable reverses, and the profile generator 208 otherwise operates as previously described to return the pusher arm to the dead plate.

The present invention may be embodied in other specific forms without departing from the spirit or essential attributes thereof and, accordingly, reference should be made to the appended claims, rather than to the foregoing specification, as indicating the scope of the invention.

I claim:

1. Article transfer mechanism for transferring one or more articles from a first location to a second location, comprising:
    a retractable-extensible pusher arm for transferring said one or more articles from said first location to said second location when extended and for releasing said one or more articles when retracted;
    fluid control means including a fluid motor operatively coupled to the pusher arm for moving said pusher arm between said first and second locations and for retracting said pusher arm from said articles and extending said pusher arm towards said articles in synchronism with movement of the pusher arm between said first and second locations;

said fluid motor including a reciprocable piston provided with a rack, a pinion gear operatively associated with said rack, and a retractable-extensible linkage operatively coupled to said pinion gear for raising and retracting said pusher arm from said articles and for lowering and extending said pusher arm towards said articles.

2. An article transfer mechanism for moving one or more articles from a first location to a second location, comprising:

an extensible-retractable pusher arm for moving said one or more articles from the first location to the second location when extended and for releasing said one or more articles when retracted;

fluid control means including a fluid motor operatively coupled to the pusher arm for moving the pusher arm between the first and second location and for extending and retracting the pusher arm in synchronism with movement of the pusher arm between the first and second locations;

a finger clip assembly having at least a pair of fingers for engaging said articles at said first location and moving said articles to aid second location;

said finger clip assembly being adapted to be snap-fastened on said pusher arm, said finger clip assembly including an operator accessible handle for enabling said finger clip assembly to be withdrawn from said pusher arm.

3. The article transfer mechanism according to claim 2 wherein said finger clip assembly is provided with one or more location holes and wherein said pusher arm is provided with one or more spring loaded ball plungers adapted and arranged to align with said location holes and thereby hold said finger clip assembly in position on said pusher arm.

4. An article transfer mechanism operatively associated with a rotating master shaft for transferring one or more articles from a first location to a second location, comprising:

a retractable-extensible pusher arm for engaging said articles when extended and releasing said articles when retracted;

means for moving said pusher arm between said first and second locations;

means for extending and retracting said pusher arm in synchronism with movement of the pusher arm between said first and second locations;

means for receiving a master pulse generated once per each revolution of the master shaft;

electronic storage means for storing data words representative of the rate of movement of said pusher arm between said first and second locations; and electronic cam means for causing said means for moving said pusher arm to move said pusher arm between said first location and said second location at a speed profile based on said data words, said electronic cam means including;

initiating means for initiating said electronic cam means after receipt of said master pulse;

generating means for generating timing pulses independent of the rotation of the master shaft, said means permitting relative variations between the rotation rate of the master shaft and the rate of generation of said timing pulses;

reading means for reading said data words in response to said timing pulses independent of the rotation of the master shaft; and actuating means for actuating said means for moving according to said data words as said words are read by said reading means.

5. The article transfer mechanism according to claim 4 wherein said electronic storage means is a PROM.

6. The article transfer mechanism according to claim 4 wherein:

said data words includes a first set of data words representative of a first speed profile for moving said pusher arm from said first location to said second location and a second set of data words representative of a second speed profile for moving said pusher arm from said second location to said first location;

further wherein said first and second speed profiles are different.

7. Apparatus for transferring one of more articles at each of a plurality of spaced locations onto a moving conveyor, an article transfer mechanism being located at each of said spaced locations, each article transfer mechanism being operatively associated with a rotating master shaft of the apparatus and comprising:

a retractable-extensible pusher arm for engaging said one or more articles when extended and releasing said one or more articles when retracted;

means for moving said pusher arm between first and second locations;

means for extending and retracting said pusher arm in synchronism with movement of the pusher arm between said first and second locations;

means for receiving a master pulse generated once per each revolution of the master shaft;

electronic storage means for storing data words representative of the rate of movement of said pusher arm between said first and second locations;

electronic cam means for causing said means for moving said pusher arm to move said pusher arm between said first location to said second location at a speed profile based on said data words, said electronic cam means including;

means for initiating said electronic cam means after receipt of said master pulse;

generating means for generating timing pulses independent of the rotation of the master shaft, said means permitting relative variations between the rotation rate of the master shaft and the rate of generation of said timing pulses; and means for reading said data words in response to said timing pulses independent of the rotation of the master shaft; and means responsive to said master pulse for actuating said electronic cam means at said spaced locations in a predetermined time sequence.

8. Apparatus in accordance with claim 7 wherein:

said data words includes a first set of data words representative of a first speed profile for moving said pusher arm from said first location to said second location and a second set of data words representative of a second speed profile for moving said pusher arm from said second location to said first location;

further wherein said first and second speed profiles of said pusher arm for at least one of said article transfer mechanisms are different.

9. An article transfer mechanism for moving one or more glassware articles produced during each cycle of an I.S. glassware forming machine from a first location on a deadplate of the I.S. machine to a second location on a moving conveyor, comprising: 'an extensible-retractable pusher arm for moving the articles from the first location to the second location when extended and for releasing the articles when retracted;

means for extending and retracting the pusher arm;
   means for receiving a master pulse generated once per each cycle of the I.S. machine;
   means for moving the pusher arm between the first and second locations;
   non-synchronous means for generating a train of pulses independent of the I.S. machine cycle, said means permitting relative variations between the I.S. machine cycle and the rate of generation of said pulses;
   means for electronically storing at preselected address locations data words representative of successive intervals of time, said data words defining a velocity profile for said pusher arm when it moves between said first and second locations,
   means for counting said independent pulses from said non-synchronous means;
   comparator means for comparing the count of said pulses with each of said stored data words; and
   means for controlling said means for moving said pusher arm based on the output of said comparator means to move said pusher arm according to said velocity profile in dependence upon said independent pulses from said non-synchronous means, said controlling means being initiated after receipt of said master pulse and otherwise being independent of the I.S. machine.

10. The article transfer mechanism according to claim 9 including means for accessing said data words based on the output of said comparator means.

11. The article transfer mechanism according to claims 9 or 10 including means for altering the number of time intervals represented by each of said data words by a selectable factor N to maintain constant the amount by which the pusher arm is moved between said first and second locations.

12. The article transfer mechanism according to claim 11 including means responsive to said means for altering said number of time intervals represented by each of said data words for causing said means for extending and retracting said pusher arm to retract said pusher arm at said second location regardless of the value of the factor N.

13. The article transfer mechanism according to claim 9 wherein said means for moving said pusher arm includes an electric stepper motor and each of said intervals of time represents the lapse in time between successive steps of said stepper motor.

14. An article transfer mechanism operatively associated with a rotating master shaft for transferring one or more articles from a first location to a second location, comprising:
   an arm for engaging the articles;
   an electric motor for moving said arm between the first and second locations;
   means for receiving a master pulse generated once per revolution of the master shaft;
   electronic cam means for controlling the rotational operation of said electric motor such that the rotational speed of the motor is varied according to a velocity profile, said electronic cam means including;
   means for initiating said electronic cam means after receipt of the master pulse;
   an oscillator for generating timing pulses independent of the rotation of the master shaft;
   an electronic memory containing data words stored therein, said data words defining said velocity profile; and
   means for reading said data words in response to said timing pulses independent of the rotation of the master shaft and for controlling the rotation of said electric motor in accordance with said data words, wherein said data words define said velocity profile.

15. An article transfer mechanism for moving one or more glassware articles produced during each cycle of an I.S. glassware forming machine from a first location on a deadplate of the I.S. machine to a second location on a moving conveyor, comprising:
   an extensible-retractable pusher arm for moving the articles from the first location to the second location when extended and for releasing the articles when retracted;
   an electric motor coupled to said pusher arm for moving the pusher arm between the first and second locations;
   means for receiving a master pulse generated once per each cycle of the I.S. machine;
   an oscillator for generating non-synchronous timing pulses independent of the I.S. machine cycle;
   an electronic memory containing data words stored therein, said data words defining a velocity profile for the rotational operation of said electric motor; and
   motor controlling means for reading said data words in response to said timing pulses independent of the I.S. machine cycle and for controlling the rotation of said electric motor in accordance with said data words independent of the I.S. machine cycle.

16. The article transfer mechanism of claim 15, wherein:
   said oscillator is a variable oscillator having means for varying the rate of said non-synchronous timing pulses independent of the I.S. machine cycle and independent of any variations in the I.S. machine speed.

17. The article transfer mechanism of claim 15 wherein:
   said electric motor is a reversible electric motor;
   said data words stored in said electric memory include a direction indicator data word; and
   said motor controlling means includes means for controlling the forward/reverse operation of said reversible electric motor in response to said direction indicator word.

* * * * *

UNITED STATES PATENT AND TRADEMARK OFFICE
CERTIFICATE OF CORRECTION

PATENT NO. : 4,923,499
DATED : May 8, 1990
INVENTOR(S) : Mark C. Newkirk

It is certified that error appears in the above-identified patent and that said Letters Patent is hereby corrected as shown below:

In block 63 of the title page, the date Serial No. 216,334 was abandoned should read --December 15, 1980--

In column 1, line 6, please change "December 16, 1980" to --December 15, 1980".

Signed and Sealed this

Twenty-second Day of September, 1992

Attest:

DOUGLAS B. COMER

*Attesting Officer*   *Acting Commissioner of Patents and Trademarks*